United States Patent [19]
Kimura

[11] 4,030,111
[45] June 14, 1977

[54] POWER-OPERATED ACTUATOR FOR A FILM ADVANCE MECHANISM OF A CAMERA

[75] Inventor: Shuji Kimura, Yokohama, Japan

[73] Assignee: Nippon Kogaku K.K., Tokyo, Japan

[22] Filed: Nov. 4, 1975

[21] Appl. No.: 628,652

[30] Foreign Application Priority Data
Nov. 13, 1974 Japan .................. 49-136562[U]

[52] U.S. Cl. .............................. 354/173; 354/213
[51] Int. Cl.² ...................................... G03B 1/00
[58] Field of Search .......... 354/173, 171, 170, 213, 354/212, 206, 204

[56] References Cited
UNITED STATES PATENTS

| 1,817,182 | 8/1931 | Fairchild | 354/173 |
| 3,084,606 | 4/1963 | Goldberg | 354/173 |
| 3,280,713 | 10/1966 | Goldberg | 354/173 X |
| 3,693,523 | 9/1972 | Tenkumo et al. | 354/173 X |

Primary Examiner—Joseph W. Hartary
Attorney, Agent, or Firm—Shapiro and Shapiro

[57] ABSTRACT

A power-operated actuator for a film advance mechanism of a camera has a motor for operating the mechanism, the actuator being constructed such that the motor starts free of the load represented by the mechanism, and being constructed such that the mechanism can be operated manually without the actuator imposing a significant load. Means may be provided for preventing jamming of the actuator should the motor be energized accidentally during manual operation of the film advance mechanism.

12 Claims, 7 Drawing Figures

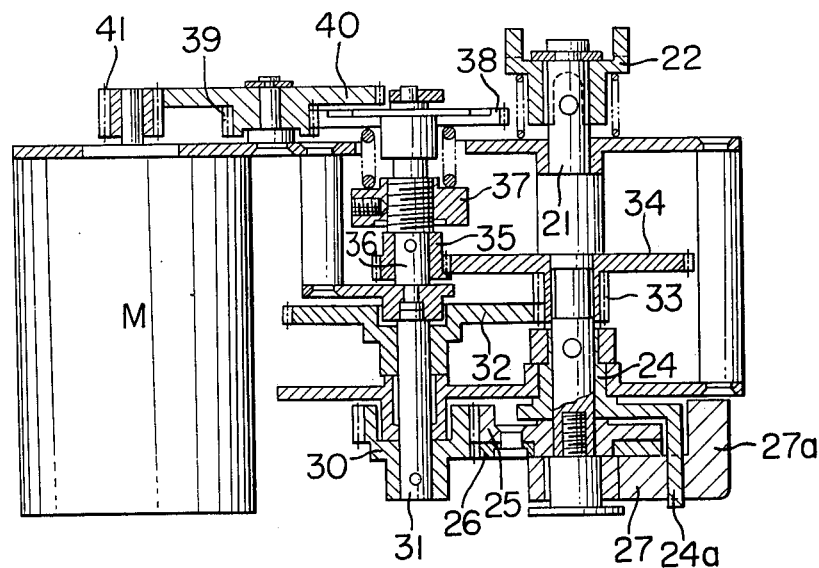
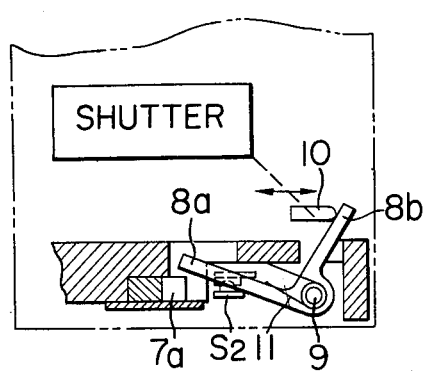
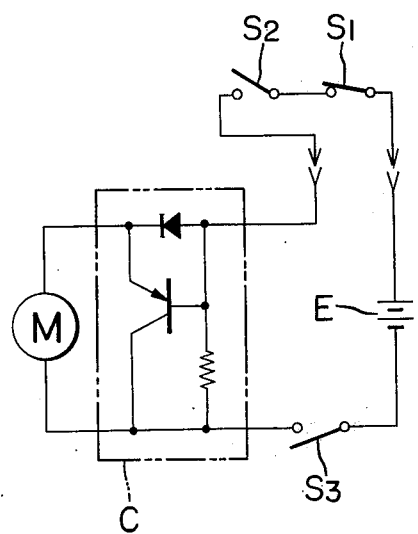

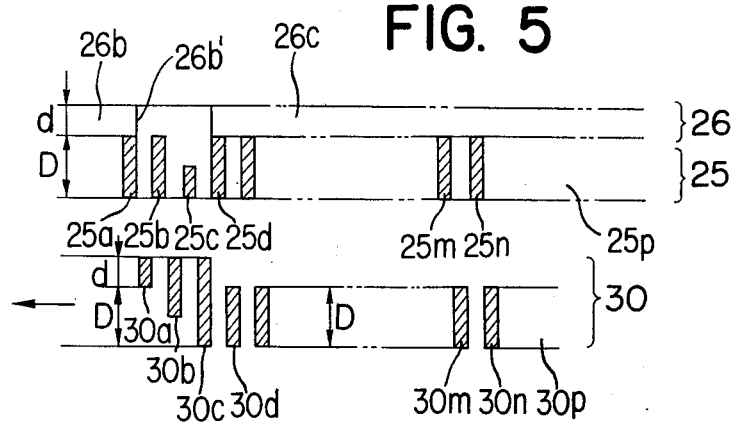
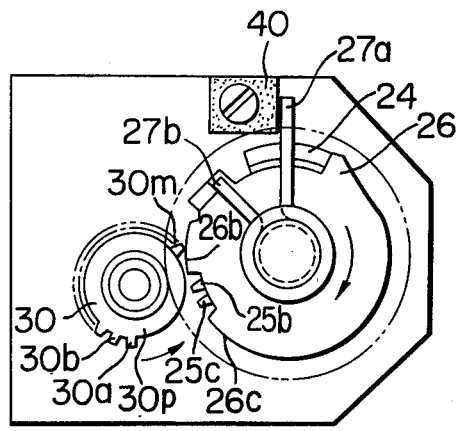
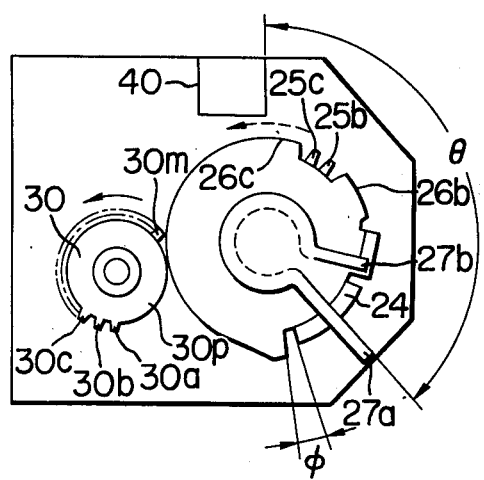

4,030,111

POWER-OPERATED ACTUATOR FOR A FILM ADVANCE MECHANISM OF A CAMERA

BACKGROUND OF THE INVENTION

1. Field of the Invention

This invention relates to a power-operated actuator for a film advance mechanism of a camera.

2. Description of the Prior Art

A power-operated film advance mechanism in a well-known camera has a motor energized in response to the return of the shutter release button to its initial position for effecting advance of the film and cocking of the shutter, operations hereinafter referred to as "reset operations".

SUMMARY OF THE INVENTION

The present invention provides a power-operated actuator for a film advance mechanism of a camera wherein the actuator has a shaft that can be coupled to a reset member rotatable against the bias of a return spring for operating the mechanism and effecting reset operations (i.e., film advance and shutter cocking), a selectively energizable motor to which a first gear is operatively connected, and a second gear operatively connected to the shaft. The first gear has an interrupted peripheral portion free of teeth so that meshing takes place with the second gear only during rotation of the first gear through a portion of a revolution when the motor is energized for rotating the second gear through a predetermined angle against the bias of the return spring, thereby rotating the reset member and effecting reset operations. During further rotation of the first gear, its interrupted portion faces the teeth on the second gear for permitting return rotation of the second gear through substantially said predetermined angle under the influence of the return spring and before the first gear completes one revolution. If the motor is de-energized and braked upon completion of the reset operations, the gears will stop with their teeth out of contact. This situation insures a no-load start of the motor when it is subsequently energized. It also enables manual rotation to be imparted to the reset member without imparting rotation to more than the second gear of the actuator, thereby preventing the actuator from imposing a significant resistance to manual movement of the reset member. Means may also be provided for preventing the gears from meshing should the motor be energized accidentally during manual rotation of the reset member. Finally, the gear teeth that initially mesh may be stepped to ensure that the teeth of one gear mesh with predetermined teeth of the other gear.

BRIEF DESCRIPTION OF THE DRAWINGS

An embodiment of the invention is illustrated in the accompanying drawings wherein:

FIG. 2 is a cross-sectional view of portions of the embodiment of the present invention;

FIG. 3 is a cross-sectional view of a further portion of the embodiment of the present invention;

FIG. 4 is a diagram of the electric circuit in the embodiment of the present invention;

FIG. 5 is a developed view of stepped gears;

FIG. 6 is a view illustrating the relation between two stepped gears when shutter release is possible; and FIG. 7 is a view illustrating the relation between the two stepped gears immediately after the completion of film advance.

DESCRIPTION OF THE PREFERRED EMBODIMENT

Figure 1:
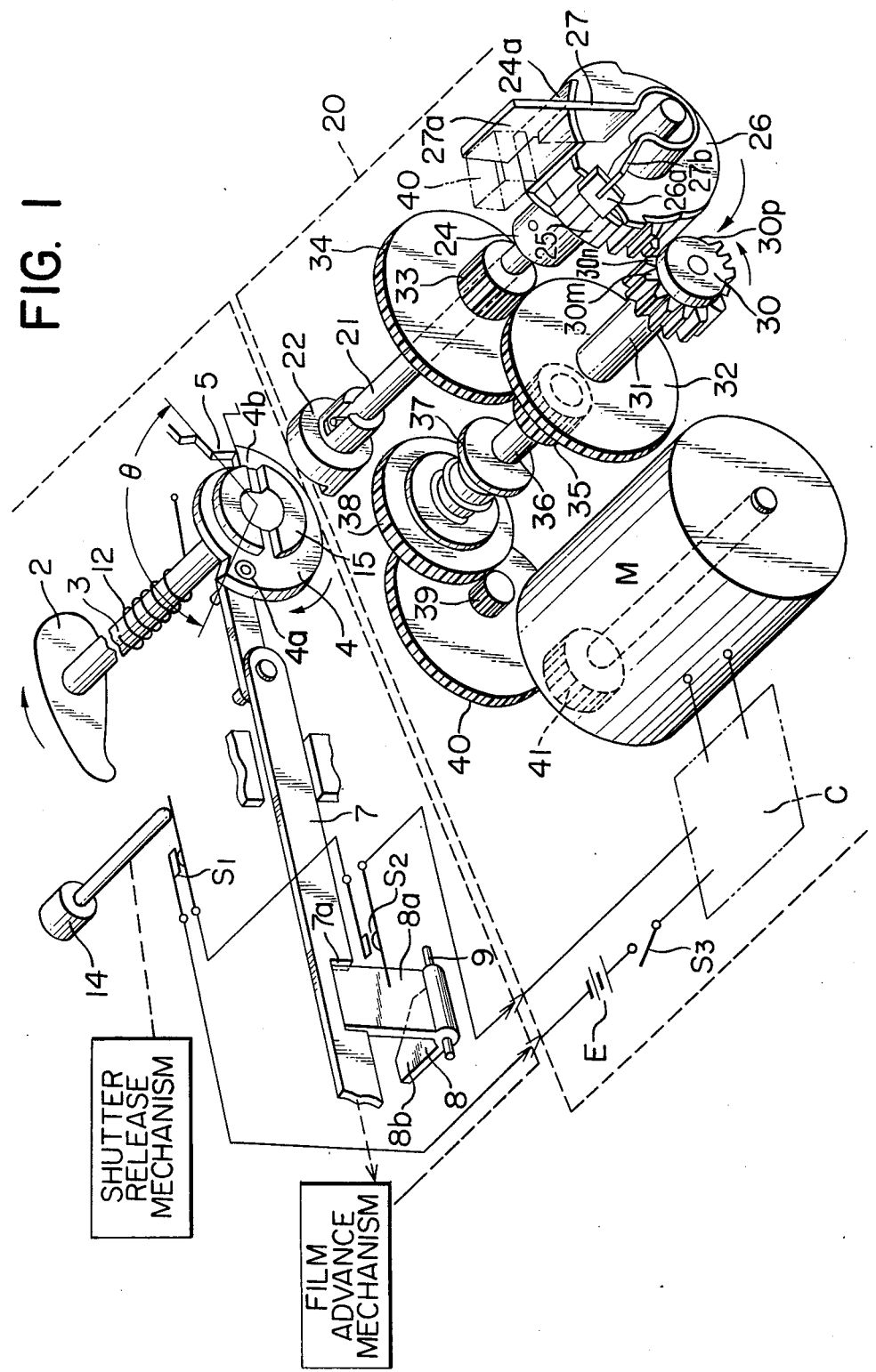
FIG. 1 is a perspective view of an embodiment of the present invention.

The present invention is hereinafter described with respect to a preferred embodiment thereof. A camera body 1 is a first discussed in reference to FIG. 1 which is a perspective view of essential portions of the embodiment and shows the position in which the reset operations have been completed.

A manually operated film advance lever 2 is operatively connected to a film advance shaft 3 on which is secured a reset member 4. An advance limiting member 5 is engageable with one of the opposite ends 4a and 4b of a notch in the disc 4 to limit the rotation of the disc 4 to an angle $\theta$. An intermediate crank 6 is pivotally coupled to the disc 4 at one end and likewise coupled to a slide bar 7 at the other end.

The slide bar 7 is slidable only horizontally as viewed in FIG. 1; and during its rightward sliding movement, the slide bar may actuate a film advance mechanism shown diagrammatically for effect film advance and shutter cocking operations.

A restraining lever 8, rotatably supported on a shaft 9, has one end 8a engageable with notch 7a of the slide bar 7, and upon completion of the film advance, end 8a will seat in notch 7a to restrain the slide bar 7 as shown. The other end 8b of the restraining lever is acted upon by an actuating arm 10, as shown in FIG. 3. In FIG. 3, when the shutter closes, the actuating member 10 is moved rightwardly to rotate the restraining lever 8 clockwise against the action of a spring 11 (which normally biases the plate 8 counter-clockwise) thus bringing the end 8a out of engagement with the notch 7a. Also, during the film advance, the actuating member 10 is moved leftwardly to permit rotation of restraining lever 8 counter-clockwise by the action of the spring 11. A switch S2 operated by the restraining lever 8 is opened when the lever engages the notch 7a and closed when the lever is brought out of the engagement. Turning back to FIG. 1, a return spring 12 biases the advance shaft 3 counter-clockwise; and after completion of the film advance, the spring will return the member 4 and the slide bar 7 to their initial positions.

Disposed between the advance lever 2 and the advance shaft 3 is a clutch (not shown) for transmitting rotation of the advance lever to the shaft only in the direction of the arrow. A shutter release button 14, when depressed, opens switch S1 and then effects shutter release.

Operation of the above described components on the camera body will now be discussed. With the components in the position shown in FIG. 1, depression of the button 14 releases the shutter, which opens and then closes to complete film exposure and causes member 10 (FIG. 3) to rotate the restraining member 8 so as to release the slide member 7 for movement (and close the switch S2, which is unimportant at this time).

As the advance lever 2 is rotated in the direction of the arrow, the member 4 is also rotated in the same direction until one end 4a of the notch therein engages the limiting member 5, the rotation of member 4 pulling member 7 rightwardly (as seen in FIG. 1) to effect the reset operations. After the end 4a engages the limiting member 5, and lever 2 is released, the return spring 12 rotates the shaft 3 and the member 4 in the direction opposite to the arrow shown in FIG. 1, and moves the slide member 7 leftwardly, returning all the components to the positions shown in FIG. 1. During the reset operations the actuating arm 10 is moved leftward in FIG. 3, allowing spring 11 to move the restraining lever 8 to a position at which end 8a is biased into contact with the side surface of the slide bar 7, but end 8a will be misaligned with notch 7a. Upon the return of bar 7 to its initial position, notch 7a will once more be aligned with end 8a allowing it to seat in notch 7a, thus restraining the slide bar 7. When the reset operations are completed, no further film advance can be effected until the shutter is released and the cycle of operations described above is repeated.

Description will now be made of power-driven actuator 20. The advance shaft 21 in the actuator has a connector 22 secured to one end thereof for coupling to a connector 15 secured to the member 4. The camera-side advance shaft 3 is thus connected to the actuator-side advance shaft 21 when the film advance device 20 is mounted on the camera body 1.

A collar 24 is secured to the shaft 21 and has a bent portion 24a extending over a stepped gear 25 rotatably mounted on the shaft 21 but held against axial movement. A cam plate 26 is secured to one side of the gear 25 (see FIG. 2). A torsion spring 27 resiliently couples the gear to the shaft and has one end 27a fixed to the bent portion 24a of the collar and the other end 27b fixed to a projection 26a secured to the cam plate 26. Spring 27 thus imparts a clockwise bias to the collar 24 and a counter-clockwise bias to the stepped gear 25. Another stepped gear 30 fixed to shaft 31 can mesh with the stepped gear 25.

A gear 32 is securely mounted on the shaft 31 and meshes with gear 33 rotatably supported on the shaft 21. Gear 34 attached to gear 33 meshes with gear 35 fixed to a shaft 36. Gears 38, 39, 40 and 41 are connected to the gear 35 through a conventional friction clutch 37, allowing rotation of the motor M to be transmitted to the stepped gear 30.

The motor M is connected to a power source E through a main switch S3, switches S1 and S2 and a conventional motor short-circuiting brake circuit C clearly shown in FIG. 4.

The two stepped gears 25 and 30 and the plate cam 26 will be described by reference to FIG. 5 which is a developed view of these components.

The peripheral edges of portions 26b and 26c of the cam, which has a thickness d, extend to the crests of the teeth on the stepped gear 25, as shown in FIG. 6.

The gear 25 has a tooth portion comprising teeth 25a – 25n. The first tooth 25a of width D is aligned with edge 26b' of the notch separating portions 26b and 26c of the cam plate 26. Leading tooth 25b adjacent the first tooth 25a is also of width D, while the next tooth 25c has a width less than D. The subsequent teeth on gear 25, namely teeth 25d to 25n, have a width D and are located adjacent to the portion 26c of the cam. Finally, gear 25 has a cut-away portion 25p without gear teeth.

The gear 30 has a tooth portion comprising teeth 30a – 30n. The first tooth 30a, of width d, meshes only with edge 26b' of cam 26. Leading tooth 30b adjacent the first tooth 30a has a width greater than d but less than d + D and meshes with a portion of the tooth 25b on gear 25. The next tooth 30c has a width equal to D+ d and meshes with tooth 25c on gear 25. Teeth 30d –30n have a width D and respectively mesh with the teeth 25d to 25n on gear 25. Finally, gear 30 has cut-away portion 30p, without teeth.

Operation of the power actuator 20 is now described. The actuator is mounted on camera body 1 so that the two connectors 15 and 22 are coupled together, and motor M is connected to the switches S1 and S2.

In the position shown in FIG. 1, switch S1 is closed and switch S2 is open. The first step to effect operation of the actuator is to close main switch S3. When the shutter button 14 is depressed, switch S1 opens and the shutter is released as previously described. In response to closing movement of the shutter, actuating member 10 (FIG. 3) acts on restraining lever 8 as previously described, freeing the slide bar 7 and closing switch S2. The return of the shutter button to its initial position shown in FIG. 1 closes switch S1 to connect power source E to motor M, which is energized thereby and rotates stepped gear 30 through the intermediate gears 41, 40, 39, 38, 35, 34, 33, and 32. As gear 30 rotates in the direction of the arrow in FIG. 6, first tooth 30a eventually meshes with edge 26b' of portion 26b of the cam plate. At the same time, leading tooth 30b meshes with leading tooth 25b on gear 25. Then, teeth 30c, 30d, etc. successively mesh with teeth 25c, 25d, etc. as rotation of gear 30 is transmitted to gear 25.

Rotation of gear 25 is transmitted through torsion spring 27 to collar 24, thereby rotating shaft 21. Member 4 is also rotated in the direction of the arrow in FIG. 1 by reason of a coupling between connectors 22 and 15. Thus, bar 7 is moved to the right as seen in FIG. 1 to effect the desired reset operations.

Just before tooth 30n and tooth 25n move out of meshing engagement due to the rotation of gear 30 by the motor, member 4 will have been rotated through the predetermined angle $\theta$, and end 4a of the member will be engaged with limiting member 5. After tooth 30n and tooth 25n are brought out of meshing engagement due to further rotation of gear 30, gear 25 will have rotated through the additional angle $\phi$ in FIG. 7 without imparting any corresponding rotation to shaft 21. This additional rotation of gear 25 is accommodated by stressing of torsion spring 27. As gear 30 continues to rotate, cut-away portion 30p of this gear is presented to gear 25, which is thus clear of engagement with gear 30. As a consequence, the motor is decoupled from member 4 and member 4 is free to return to its position shown in FIG. 1 under the bias exerted by spring 12 and to move bar 7 back to its position shown in FIG. 1. The return rotation of member 4 also returns shaft 21 and gear 25 to their positions as shown in FIG. 6. Upon the return of slide bar 7 is its initial position, arm 10 allows end 8a of restraining lever 8 to seat in notch 7a to restrain the slide bar and also to open switch S2. Upon opening of this switch, motor M is de-energized and abrubtly stops by reason of brake circuit C.

Spring 12 returns the various components to their initial position before the motor drives gear 30 back to its initial position and in fact gear 30 rotates only slightly beyond the point at which the gear teeth disengage when the motor is de-energized. At the end of the return movement of gear 25 to its initial position, end 27a of the torsion spring 27 strikes positioning stop 40 as shown in FIG. 6. The initial angular position of gear 25 before reset operations are effected may be somewhat variable by reason of tolerances in the components, or aging of torsion spring 27, but the relative angular position of gear 25 to gear 30 prior to energization of motor M is not critical since the stepped nature of these gears insures that tooth 30a will mesh only with edge 25b' of cam 26, and tooth 30b will only mesh with tooth 25b. This arrangement precludes the possibility that the free ends of the teeth on gear 30 will jam into the free ends of the teeth on the gear 25, a situation that may occur in the absence of providing stepped teeth.

It is also seen from FIGS. 1 and 6 that in the normal position of gear 30, cut-away portion 30p faces gear 25 and the leading teeth on the gears are spaced. Some angular rotation of gear 30 will therefore take place before any of the teeth thereon mesh with the teeth on gear 25. This means that motor M can be started under low load conditions, allowing the motor to accelerate before a load is imposed thereon by the meshing of the teeth on gear 30 with the teeth on gear 25 and the consequent automatic coupling of the motor to member 4. Furthermore, the stepped nature of the teeth on these gears insures that two teeth mesh simultaneously during initial meshing engagement of the gears. This has the effect of increasing the resistance of the gear teeth to shock caused by the impact of the moving gear on the stationary gear.

Description is now made of the case in which advance lever 2 is to be used when the power driven actuator is mounted on camera body 1. In such case, main switch S3 will be open when button 14 is depressed releasing the shutter in the manner previously described and freeing member 4 for rotation. Upon manual rotation of lever 2, the mating of connectors 15 and 22 imparts rotation to shaft 21. Such rotation is coupled to gear 25 through torsion spring 27. Because stepped gear 30 has its cut-away portion 30p facing gear 25 during its rotation, no rotation is imparted to gear 30. In other words, none of the gears 30, 32, 33, 34, 38, 39, 40, and 41 will be rotated when stepped gear 25 is rotated in response to rotation of lever 2, with the result that no additional load is imposed by actuator 20 on the manual rotation of lever 2.

Inadvertent closure of switch S3 during the course of reset being effected by manual rotation of lever 2 will not have an adverse effect on the actuator. Such closure of switch S3 will energize motor M since the switches S1 and S2 will be closed, and gear 30 will rotate. However, tooth 30a of gear 30 will engage the edge 26c of the cam plate (gear 25 and cam plate 26 having been rotated from their positions shown in FIG. 6) inhibiting further rotation of gear 30 to prevent abnormal meshing engagement between gears 25 and 30. Clutch 37 will thereafter slip, allowing motor M to rotate without imparting any further rotation to gear 30, holding tooth 30a against portion 26c and effectively preventing further manual rotation of lever 2. As soon as switch S3 is again open, motor M will be de-energized to release tooth 30a from the surface 26c of the cam plate, thereby permitting further rotation of lever 2 to effect normal reset operations.

I claim:

1. In a camera having a film advance mechanism that includes a movable member for operating the mechanism, the combination of:
   a. manually operable actuator means for manually moving the member;
   b. motor driven actuator means for moving the member; and
   c. means decoupling the motor of said motor driven actuator means from said member while said motor is de-energized and for automatically coupling said motor to said member in response to initial operation of said motor driven actuator means, whereby said manually operable actuator means is not loaded by said motor and whereby the motor starting load is substantially reduced.

2. The combination of claim 1 including means for preventing the motor driven actuator means from moving the member during its movement by the manually operable actuator means.

3. In combination with a camera having a film advance mechanism that includes a film advance member rotatable against the bias of a return spring from an initial position through a predetermined angle for operating the film advance mechanism, a power-operated actuator having a driving motor, means driven by said motor for rotating said member against the bias of the return spring through said predetermined angle, means for thereafter automatically decoupling said motor from said member to permit said spring to return said member to said initial position, and means for de-energizing said motor while it is decoupled from said member.

4. A power-operated actuator for a camera having a film advance mechanism that includes a member rotatable against the bias of a return spring for operating the film advance mechanism, said actuator comprising:
   a. a shaft adapted to be coupled to the member so that both rotate together;
   b. a selectively energizable motor;
   c. a first gear operatively connected to the motor;
   d. a second gear operatively connected to the shaft; and
   e. cooperable means on the gears engageable during rotation of the first gear through one portion of a revolution when the motor is energized for rotating the second gear through a predetermined angle against the bias of the return spring thereby rotating the member, and disengageable during further rotation of the first gear for permitting the return rotation of the second gear through substantially said predetermined angle under the influence of the return spring and before the first gear completes one revolution.

5. A power-operated actuator according to claim 4 wherein the cooperable means on the gears are their teeth, the teeth on the first gear being interrupted and extending only partially around the periphery thereof to define an interrupted portion that provides clearance for the teeth on the second gear during its return rotation.

6. A power-operated actuator according to claim 5 wherein the second gear is connected to a shaft by a resilient member.

7. A power-operated actuator according to claim 6 wherein said resilient member is a torsion spring, one end of which is connected to the second gear, the second gear being rotatably mounted on the shaft, and the other end of the torsion spring being connected to the shaft.

8. A power-operated actuator according to claim 6 wherein said cooperable means causes the leading tooth on the first gear adjacent the interrupted portion to engage a specific tooth on the second gear regardless of the relative angular position of the gears prior to energization of the motor.

9. A power-operated actuator according to claim 8 wherein said cooperable means is such that the leading tooth on the first gear is spaced from said specific tooth on the second gear when the motor is de-energized whereby the motor starts under low torque conditions when subsequently energized.

10. A power operated actuator according to claim 8 wherein the ends of each of said leading tooth on the first gear and the tooth on the second gear adjacent said specific tooth are stepped to provide clearance between the leading tooth on the first gear and said adjacent tooth on the second gear.

11. A power-operated actuator according to claim 8 including a cam plate rigidly attached to the second gear and having a periphery that extends to the crest of the teeth that are engaged by the teeth on the first gear, the cam plate having a notch adjacent the specific tooth on the second gear, and the first gear having a first tooth engaging only with the edge of the notch without engaging teeth on the second gear.

12. A power-operated actuator according to claim 11 wherein the first gear is connected to the motor through a clutch that slips if the first gear engages the periphery of the cam plate.

* * * * *